(12) United States Patent
Kawanishi et al.

(10) Patent No.: US 8,170,422 B2
(45) Date of Patent: May 1, 2012

(54) FREQUENCY SHIFT KEYING DEMODULATOR

(75) Inventors: Tetsuya Kawanishi, Koganei (JP);
Masayuki Izutsu, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 1113 days.

(21) Appl. No.: 11/658,127

(22) PCT Filed: Jul. 19, 2005

(86) PCT No.: PCT/JP2005/013534
§ 371 (c)(1),
(2), (4) Date: Feb. 14, 2008

(87) PCT Pub. No.: WO2006/009269
PCT Pub. Date: Jan. 26, 2006

(65) Prior Publication Data
US 2008/0304827 A1    Dec. 11, 2008

(30) Foreign Application Priority Data
Jul. 20, 2004   (JP) ................................ 2004-211185

(51) Int. Cl.
*H04J 14/00* (2006.01)
(52) U.S. Cl. ........ 398/161; 398/140; 398/141; 398/142; 398/158; 398/159; 398/187
(58) Field of Classification Search .................. 398/212, 398/140–172, 187; 359/124, 133
See application file for complete search history.

(56) References Cited

U.S. PATENT DOCUMENTS

| | | | | |
|---|---|---|---|---|
| 5,594,577 | A  * | 1/1997  | Majima et al. | 398/79 |
| 6,359,716 | B1 * | 3/2002  | Taylor | 398/212 |
| 6,959,154 | B1 * | 10/2005 | Gnauck et al. | 398/159 |
| 7,239,763 | B2 * | 7/2007  | Kawanishi et al. | 385/1 |

(Continued)

FOREIGN PATENT DOCUMENTS
JP    3-52341    3/1991
(Continued)

OTHER PUBLICATIONS delay. (2007). In The American Heritage® Dictionary of the English Language. Retrieved from http://www.credoreference.com/entry/hmdictenglang/delay.*

(Continued)

*Primary Examiner* — Nathan Curs
*Assistant Examiner* — Tanya Ngo
(74) *Attorney, Agent, or Firm* — Osha Liang LLP (57) ABSTRACT

It is an object of the present invention to provide an FSK demodulator which can be used in the optical information and telecommunications and the like, and which can appropriately demodulate an FSK signal by compensating a delay of an optical FSK modulated signal due to dispersion and the like of an optical fiber.

The above-mentioned problem is solved by a frequency shift keying (FSK) demodulator (1) composed of a branching filter (2) for branching an optical signal according to wavelengths thereof; a delay adjusting apparatus (3) for adjusting a delay time of two lights branched by the branching filter; a first photodetector (4) for detecting one optical signal branched by the branching filter; a second photodetector (5) for detecting a remaining optical signal branched by the branching filter; and a means (6) for calculating a difference between an output signal of the first photodetector and an output signal of the second photodetector.

5 Claims, 5 Drawing Sheets

U.S. PATENT DOCUMENTS

| | | | | |
|---|---|---|---|---|
| 7,245,787 | B2* | 7/2007 | Kawanishi et al. | 385/1 |
| 7,421,209 | B2* | 9/2008 | Kawanishi et al. | 398/183 |
| 7,957,652 | B2* | 6/2011 | Kawanishi et al. | 398/186 |
| 7,957,653 | B2* | 6/2011 | Kawanishi et al. | 398/188 |
| 2005/0111853 | A1* | 5/2005 | Kawanishi et al. | 398/187 |
| 2005/0175357 | A1* | 8/2005 | Kawanishi et al. | 398/187 |

FOREIGN PATENT DOCUMENTS

| | | |
|---|---|---|
| JP | 5-206952 | 8/1993 |
| JP | 11-17746 | 1/1999 |

OTHER PUBLICATIONS

International Search Report for PCT/JP2005/013534 mailed Oct. 25, 2005, with translation, 6 pages.

Patent Abstracts of Japan 11-017746 dated Jan. 22, 1999, 1 page (Corresponds to BA Above and is also referenced on p. 1 in the specification of the present application).

T. Kawanishi, et al., "Optical Frequency shifter with SSB Modulator", Technical Report of IEICE, OCS2002-49, PS2002-33, OFT2002-30 (Aug. 2002), 6 pages (also mentioned on p. 1 in the specification of the present application).

T. Kawanishi, et al. "Optical FSK Modulator Using an Integrated Lightwave circuit Consisting of four Optical Phase Modulators," CPR 2004 G-3, Tokyo, Japan, Jan. 14-16, 2004, 4 pages (also mentioned on p. 1 of specification in the present application).

International Search Report for PCT/JP2005/013534 mailed Mar. 15, 2007, 7 pages.

Patent Abstracts of Japan 03-052341 dated Mar. 6, 1991, 2 pages (Corresponds to BB above).

Patent Abstracts of Japan 05-206952 dated Aug. 13, 1993, 2 pages (Corresponds to BC Above).

A. F. Elrefaie et al. "Chromatic Dispersion Limitations for FSK and DPSK Systems with Direct Detection Receivers" IEEE Photonics Technology Letters, vol. 3, No. 1, Jan. 1991, pp. 71-73, 3 pages.

T. Kawanishi et al. "LiNbO$_3$ high-speed optical FSK modulator" Electroic Letters May 27, 2004, vol. 40 No. 11, 2 pages.

S. M. Reza Motaghian Nezam et al., "Degree-of-Poliarization-Based PMD Monitoring for Subcarrier-Multiplexed signals via Equalized Carrier/Sideband Filtering", Journal of Lightwave Technology, vol. 22, No. 4, Apr. 2004, pp. 1078-1085, 8 pages.

Kazushige Yonenaga et al. "A Fiber Chromatic Dispersion Compensation Technique with an Optical SSB Transmission in Optical Homodyne Detection Systems" Photonics Technology Letters, vol. 5, No. 89, Aug. 1993, pp. 949-951, 4 pages.

T. Kawanishi et al. "10 Gbit/s FSK transmission over 130 km SMF using group delay compensated balance detection" annual Meeting of the IEEE, Lasers and Electro-Optics society, 2004. LEOS 2004. OTuL1, Mar. 8, 2005, 3 pages.

\* cited by examiner

FREQUENCY SHIFT KEYING DEMODULATOR

TECHNICAL FIELD

The present invention relates to a frequency shift keying demodulator, and a frequency shift keying communication system using the same.

BACKGROUND ART

An optical frequency shift keying (optical FSK) is a technology which applies modulation to a frequency of light and transmits variations in the frequency as a signal. An FSK signal generally carries no information on its amplitude, so that it has a feature of being less subject to a level fluctuation or noise.

An FSK system using a digital signal has been already known (see e.g. Japanese patent application laid-open No. 11-17746). However, this technology is related to shifting the frequency of the digital signal, so that the frequency of light is not shifted.

As an example which shifts a frequency of an optical signal to be outputted, there is an optical single side-band (optical SSB) modulator (Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08). An optical FSK modulator using this optical SSB modulator is known (see T. Kawanishi and M. Izutsu, "Optical FSK modulator using an integrated lightwave circuit consisting of four optical phase modulator", CPR 2004 G-3, Tokyo, Japan, 14-16 Jan. 2004).

Figure 4:
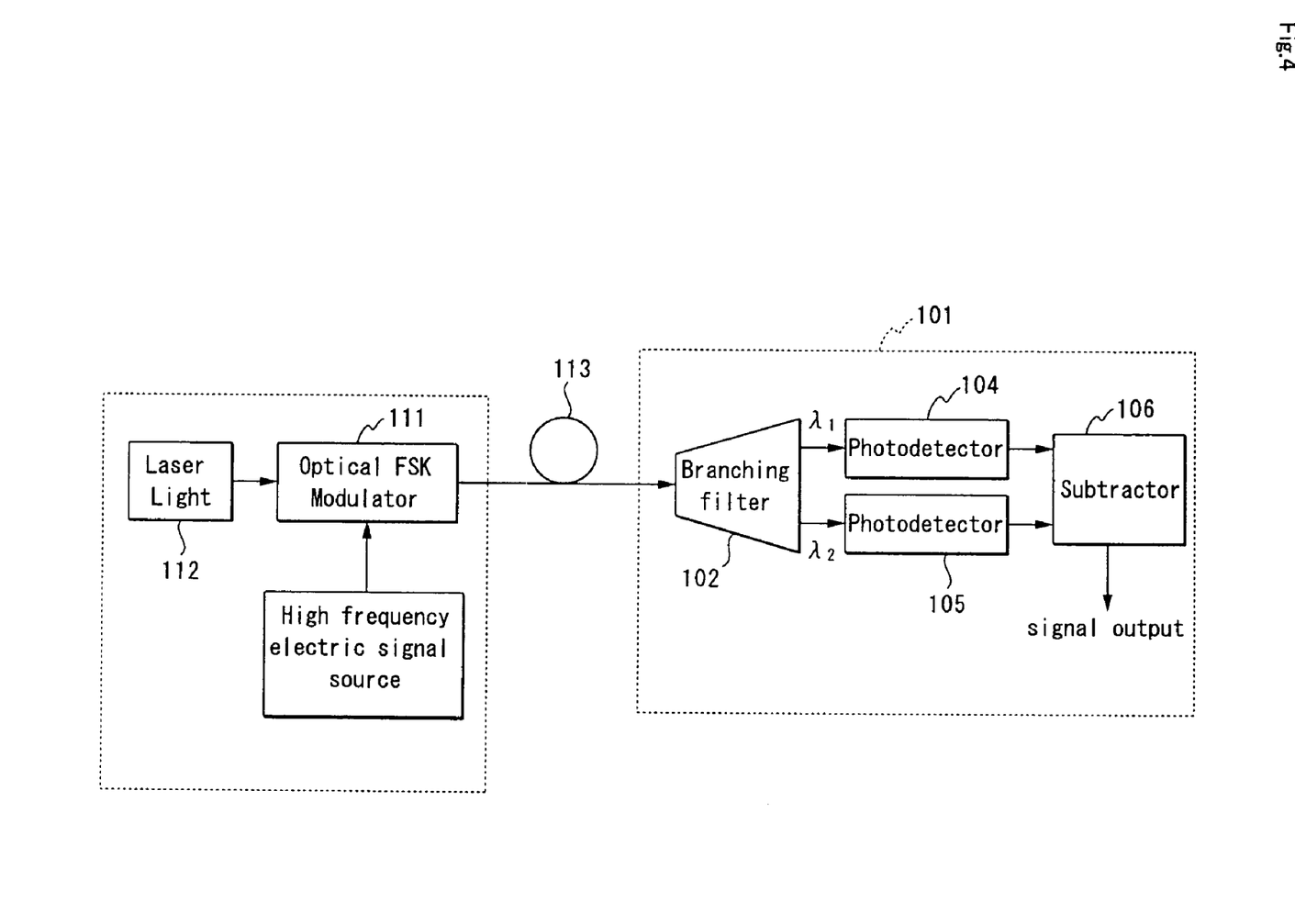
FIG. 4 is a diagram showing a basic arrangement of an FSK communication system including an optical FSK modulator.

FIG. 4 is a diagram showing a basic arrangement of an optical FSK communication system including such an optical FSK modulator. As shown in FIG. 4, a conventional FSK communication system is composed of an FSK demodulator (101) demodulating an optical FSK signal, an FSK modulator generating the optical FSK signal, and an optical fiber (113) connecting the optical FSK modulator and the FSK demodulator. The FSK demodulator separates the optical FSK signal into an USB signal and an LSB signal, whose respective intensities are measured by a photodetector, converted into electric signals, and a difference therebetween is obtained by a subtractor (106). At this time, a dispersive medium such as the optical fiber (113) generates a dispersion, so that frequencies of the USB signal and the LSB signal are different by two times the frequency of a modulating signal, thereby generating a time difference (delay) before the USB signal and the LSB signal reach photodetectors (104) and (105) respectively (namely, the USB signal reaches the photodetector earlier). It is to be noted that "112" in FIG. 4 denotes a light source.

Figure 5:
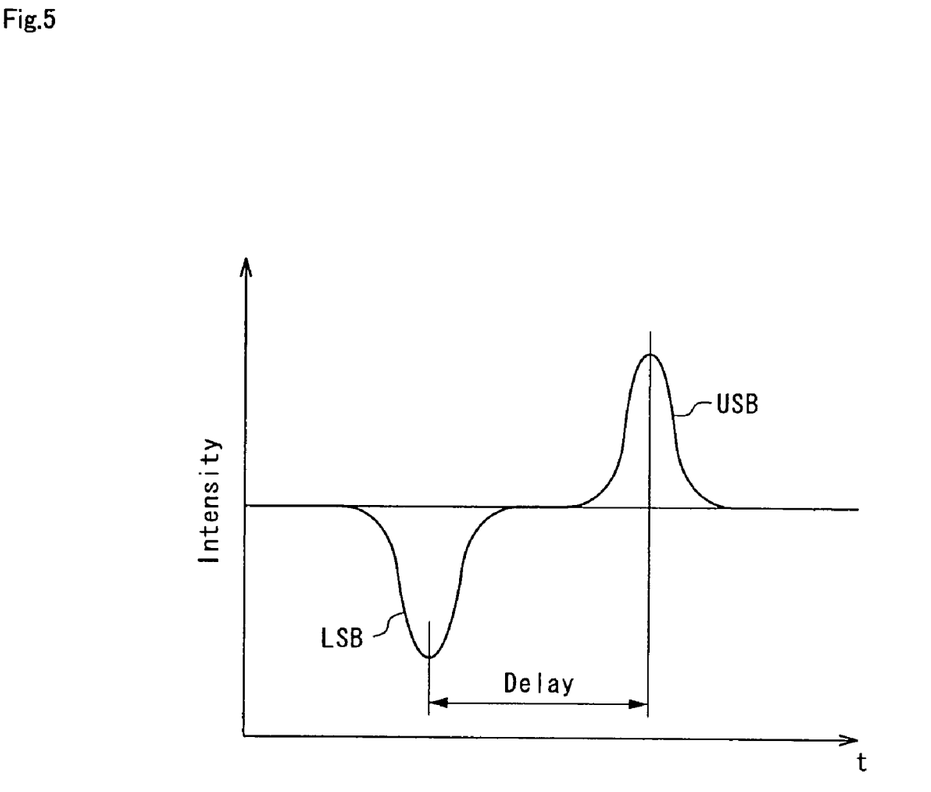
FIG. 5 is a schematic diagram for showing a delay.

FIG. 5 is a schematic diagram showing such a delay. Due to this delay, there is a problem that a difference of intensities between the USB signal and the LSB signal cannot be appropriately obtained by the subtractor.

DISCLOSURE OF THE INVENTION

It is an object of the present invention to provide a new FSK demodulator which can be used in the optical information and telecommunications and the like.

It is another object of the present invention to provide an FSK demodulator which can be used in the optical information and telecommunications and the like, and which can appropriately demodulate an FSK signal by compensating a delay of an optical FSK modulated signal due to dispersion and the like of an optical fiber.

It is another object of the present invention to provide an FSK communication system which can be used in the optical information and telecommunications and the like, and which can transmit information at a high speed.

The present invention is basically based on a knowledge that when demodulating an optical FSK signal, a delay is generated between the USB signal and the LSB signal, and the FSK signal can be demodulated more appropriately by eliminating the delay.

1. In order to solve at least one of the above-mentioned problems, a frequency shift keying (FSK) demodulator of the present invention is provided with: a means (2) for branching an optical signal according to wavelengths thereof; a means (3) for adjusting a delay time of two lights branched by the branching means; a means (4) for detecting one optical signal branched by the branching means; a means (5) for detecting a remaining optical signal branched by the branching means; and a means (6) for calculating a difference between an output signal of the first photodetector and an output signal of the second photodetector.

Namely, since a delay time of an USB signal and an LSB signal can be adjusted by "a means (3) for adjusting a delay time of two lights branched by the branching means", the FSK demodulator of the present invention can appropriately demodulate an optical FSK signal.

2. In a preferred embodiment of the FSK demodulator of the present invention, the optical signal in the "means for branching an optical signal according to wavelengths thereof" is optical FSK signal and the "means for branching an optical signal according to wavelengths thereof" is a means for branching into an upper side band (USB) signal and a lower side band (LSB) signal of an optical FSK signal.

3. A preferred embodiment of the FSK demodulator of the present invention is one in which the "means (3) for adjusting a delay time of two lights branched by the branching means" adjusts the delay time of the lights by adjusting an optical path length of one or both of the two lights branched by the "means (2) for branching an optical signal according to wavelengths thereof". Namely, as a method for adjusting a delay time, a method of adjusting the delay time in a state of light and a method of adjusting the delay time after converting the light into an electric signal can be mentioned. Among these, the latter cannot be easily adjusted since an electric signal circuit system should be reconfigured. On the other hand, with the former, the delay time can be easily adjusted by preparing a plurality of mirrors, for example, and by adjusting locations of the mirrors to change optical path lengths, so that it is preferable.

4. A preferred embodiment of the FSK demodulator of the present invention is one in which the "means (3) for adjusting a delay time of two lights branched by the branching means" is capable of changing the adjusted delay time. Such an FSK demodulator is preferable since the delay time can be adjusted according to a change of a modulation signal of an optical FSK modulator, a kind and a length of a dispersive medium, and the like. As a more specific adjusting method, one that changes an optical path length by changing the location of the mirror can be mentioned.

5. A preferred embodiment of the FSK demodulator of the present invention is one in which the "means (3) for adjusting a delay time of two lights branched by the branching means" adjusts the delay time only by a predetermined time. For example, when only two kinds of modulating frequencies are used, an analogue (continuous) adjustment need not be necessary for the delay time. Therefore, one made capable of adjusting the delay time for a fixed length of time can be preferably used for such an intended use.

6. In order to solve at least one of the above-mentioned problems, the FSK communication system of the present invention includes: an optical FSK modulator; an FSK demodulator as described the above; and a dispersive medium connecting the optical FSK modulator and the FSK demodulator.

7. A preferred embodiment of the FSK communication system according to the present invention is an FSK communication system uses, as the optical FSK modulator, an optical FSK modulator comprising: a first sub Mach-Zehnder waveguide ($MZ_A$); a second sub Mach-Zehnder waveguide ($MZ_B$); a main Mach-Zehnder waveguide ($MZ_A$) comprising the $MZ_A$, the $MZ_B$, an input portion for a light and an output portion for a modulated light; a first RF electrode ($RF_A$ electrode) inputting a radio frequency (RF) signal to two arms composing the $MZ_A$; a second RF electrode ($RF_B$ electrode) inputting an RF signal to two arms composing the $MZ_B$; and a third RF electrode ($RF_C$ electrode) that is a traveling-wave-type electrode controlling a frequency of the light outputted from the output portion by controlling a frequency of the RF signal inputted; and modulating the frequency of the light outputted from the output portion by controlling a frequency of a modulating signal inputted to the $RF_C$ electrode that is the traveling-wave-type electrode corresponding to the RF signal. Since such an optical FSK modulator can change an USB signal and an LSB signal at a high speed, an optical FSK communication system capable of transmitting information at a high speed can be provided.

8. A preferred embodiment of the FSK communication system according to the present invention is an FSK communication system in which the "means (3) for adjusting a delay time of two lights branched by the branching means" has a means for controlling a length of the adjusted delay time according to the frequency of the modulating signal of the optical FSK modulator, a length of the dispersive medium, and a dispersion of the dispersive medium. With such a system, the controlling means automatically outputs instructions for adjusting the delay time according to a frequency of a modulating signal of the optical FSK modulator, a length of the dispersive medium, and a dispersion of the dispersive medium, so that a preferable FSK demodulation is achieved.

9. A preferred application of the FSK communication system of the present invention is a method for measuring a dispersion of a dispersive medium using the above-mentioned FSK communication system based on a distance between the optical FSK modulator and the FSK demodulator, a modulating frequency of an optical FSK signal, and the delay time of the lights. Namely, since a predetermined relationship exists between the distance between the optical FSK modulator and the FSK demodulator, the modulating frequency of the optical FSK signal, the delay time of the lights, and the dispersion of the dispersive medium, so that the dispersion of the dispersive medium can be obtained by using this relationship and information other than the dispersion of the dispersive medium.

10. A preferred application of the FSK communication system of the present invention is a method for obtaining a distance between the optical FSK modulator and the FSK demodulator using the above-mentioned FSK communication system based on a dispersion of the dispersive medium existing between the optical FSK modulator and the FSK demodulator, a modulating frequency of an optical FSK signal, the delay time of the lights, and the delay time of the lights. Namely, since a predetermined relationship exists between the distance between the optical FSK modulator and the FSK demodulator, the modulating frequency of the optical FSK signal, the delay time of the lights, and the dispersion of the dispersive medium, so that the distance between the optical FSK modulator and the FSK demodulator can be obtained from this information and information other than the distance between the optical FSK modulator and the FSK demodulator.

According to the present invention, since the FSK demodulator of the present inventions is an FSK demodulator of a nonconventional arrangement, it is made possible to provide a new FSK demodulator which can be used in the optical information and telecommunications and the like.

According to the present invention, since the "means for adjusting a delay time of two lights branched by the branching means" adjusts the delay time of the USB signal and the LSB signal, it is made possible to provide an FSK demodulator which can appropriately demodulate an FSK signal by compensating a delay of an optical FSK modulated signal due to dispersion and the like of an optical fiber.

According to the present invention, since a special FSK modulator is used, it is possible to provide an FSK communication system which can be used in the optical information and telecommunications and the like, and which can transmit information at a high speed.

BEST MODE OF CARRYING OUT THE INVENTION

1. FSK Demodulator

Figure 1:
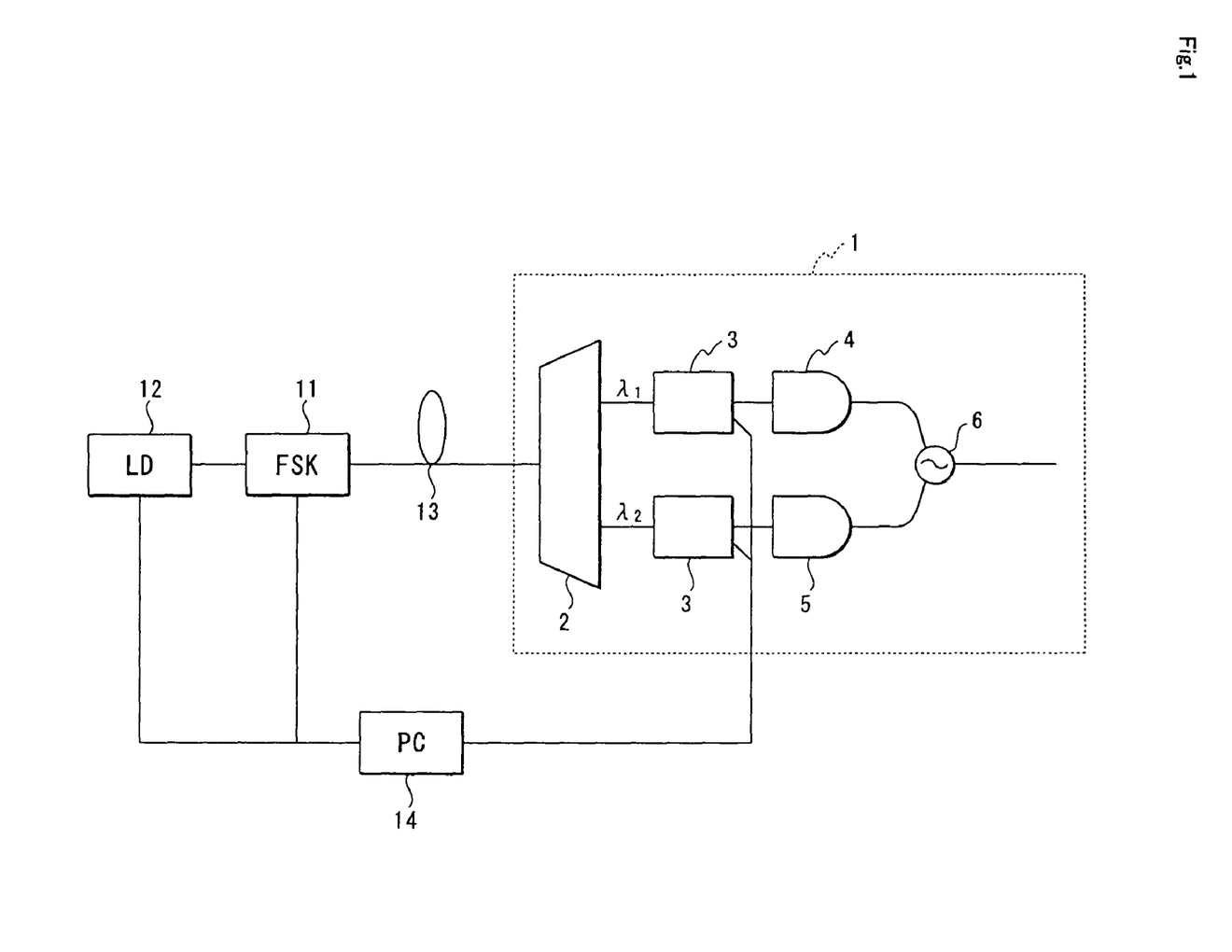
FIG. 1 is a diagram showing a basic arrangement of an FSK demodulator of the present invention.

FIG. 1 is a diagram showing a basic arrangement of an FSK demodulator of the present invention. As shown in FIG. 1, the FSK demodulator (1) of the present invention is provided with a means (2) for branching an optical signal transmitted from the transmitter according to wavelengths thereof; a means (3) for adjusting a delay time of two lights branched by the branching means; a means (4) for detecting one optical signal branched by the branching means; a means (5) for detecting a remaining optical signal branched by the branching means; and a means (6) for calculating a difference between an output signal of the first photodetector and an output signal of the second photodetector.

1.1. Branching Filter

For "a means for branching an optical signal transmitted from the transmitter according to wavelengths thereof", a branching filter can be mentioned (hereinafter, this means is occasionally referred to as "branching filter"). As the branching filter (2), a publicly known branching filter such as an interleaver can be adopted. Since the light branched by the branching filter is an optical FSK signal, one that branches into an upper side band (USB) signal and a lower side band (LSB) signal of the optical signal is used. The interleaver is a device having a characteristic that can branch an incoming wavelength multiplexed optical signal into a pair signal systems whose wavelength interval is doubled and conversely combines a pair of wavelengths multiplexed signals into one signal system whose wavelength interval is halved. According to the interleaver, a sharp signal transmitting wavelength region can be obtained, so that signals of adjacent channels can be reliably separated, thereby preventing a mixture of another wavelength and a degradation of the communication quality. As an interleaver, a fiber-type interleaver including a plurality of fiber couplers, a multilayered interleaver including a multilayered film and a prism, a multiple inflection plate-type interleaver including a multiple inflection plate and a polarized wave separating device, and a waveguide-type interleaver using a waveguide can be mentioned. More specifically, interleavers such as Nova-Interleavers manufactured by Optoplex Corporation, OC-192 and OC-788 manufactured by Nexfon Corporation can be mentioned.

1.2. Delay Adjusting Apparatus

As "a means (3) for adjusting a delay time of two lights branched by the branching means", a publicly known delay adjusting apparatus can be mentioned (hereinafter, this means is also called as "delay adjusting apparatus"). As such a delay adjusting apparatus, a delay adjusting apparatus capable of adjusting an optical path length can be mentioned. The delay time (therefore a mirror position) of this delay adjusting apparatus may be adjustable automatically as appropriate, or may be fixed.

1.3. Photodetector

As "a means (4) for detecting one optical signal ($\lambda_1$) branched by the branching means" and "a means (5) for detecting a remaining optical signal ($\lambda_2$) branched by the branching means", a publicly known photodetector can be mentioned (hereinafter, this means is also called "photodetector"). The photodetector detects a light signal and converts it into an electric signal. As the photodetector, devices including a photodiode, for example, can be adopted. It is to be noted that the optical signal ($\lambda_1$) and the optical signal ($\lambda_2$) are the USB signal and the LSB signal that are optical signals having shifted the frequency upwards and downwards for a modulating frequency compared to carrier wave.

1.4. Subtractor

As "a means (6) for calculating a difference between an output signal of the first photodetector and an output signal of the second photodetector", a publicly known subtractor can be mentioned. As a subtractor, devices and the like including a computational circuit for calculating a difference between an output signal of the first photo detector and an output signal of the first photo detector.

1.5. Others

The FSK demodulators of the present invention may include publicly known arrangements other than those mentioned above to be used for the demodulator. While not specifically shown in figures, one provided with a dispersion compensating apparatus on an optical path after the branching filter (2) is preferable. This is because such a dispersion compensating apparatus can compensate the light scattered by the optical fiber.

While not specifically shown in figures, one provided with an optical amplifier is preferable. The optical light outputted from the branching filter such as an interleaver may assume smaller amplitude. Therefore, by restoring the amplitude by the optical amplifier, a communication over a long distance can be endured. Such an optical amplifier is preferably provided for each of the USB signal and the LSB signal.

2. Operation of FSK Demodulator

Hereinafter, an operation of the FSK demodulator will be described. The FSK demodulator (1) receives an optical FSK signal. Then, the branching filter (2) branches the optical signal transmitted from a transmitter according to the wavelengths thereof, thereby branching into the USB light ($\lambda_1$) and the LSB light ($\lambda_2$). The delay adjusting apparatus (3) eliminates the delay time of the USB light ($\lambda_1$) and the LSB light ($\lambda_2$), for example, by adjusting an optical path length according to the delay time. The first photodetector (4) detects one optical signal branched by the branching filter to be converted into an electric signal. The second photodetector (5) detects a remaining optical signal branched by the branching filter to be converted into an electric signal. The subtractor (6) calculated a difference between an output signal of the first photodetector and an output signal of the second photodetector. Then the signal obtained by the subtractor is outputted to a monitor or the like which is not shown. Thus, an FSK signal demodulation having solved the problem of an optical delay due to a dispersion of light is made possible.

3. Optical FSK Communication System

Hereinafter, an optical FSK communication system using the FSK demodulator will be described. As shown in FIG. 1, the optical FSK communication system of the present invention includes an FSK modulator (11), a light source (12), the FSK demodulator (1), a dispersive medium (13) connecting the optical FSK modulator and the FSK demodulator, and a controlling means (14). Among these, for the FSK modulator, one described above can be used.

3.1. Optical FSK Modulator

As an optical FSK modulator, one that changes an oscillating wavelength of a laser itself by changing an electric current provided to a wavelength variable laser light source can be mentioned. In addition, one that obtains an optical FSK signal by improving an optical SSB modulator without changing a frequency of the light source can be mentioned. By using the optical FSK modulator such as the latter, since a cycle of the FSK signal can be shortened, information can be superimposed at a high speed, so that it is preferable. Hereinafter, an optical SSB modulator will be described first, ant then an optical FSK modulator having improved such an optical SSB modulator will be described.

3.1.1. Optical SSB Modulator

Figure 2:
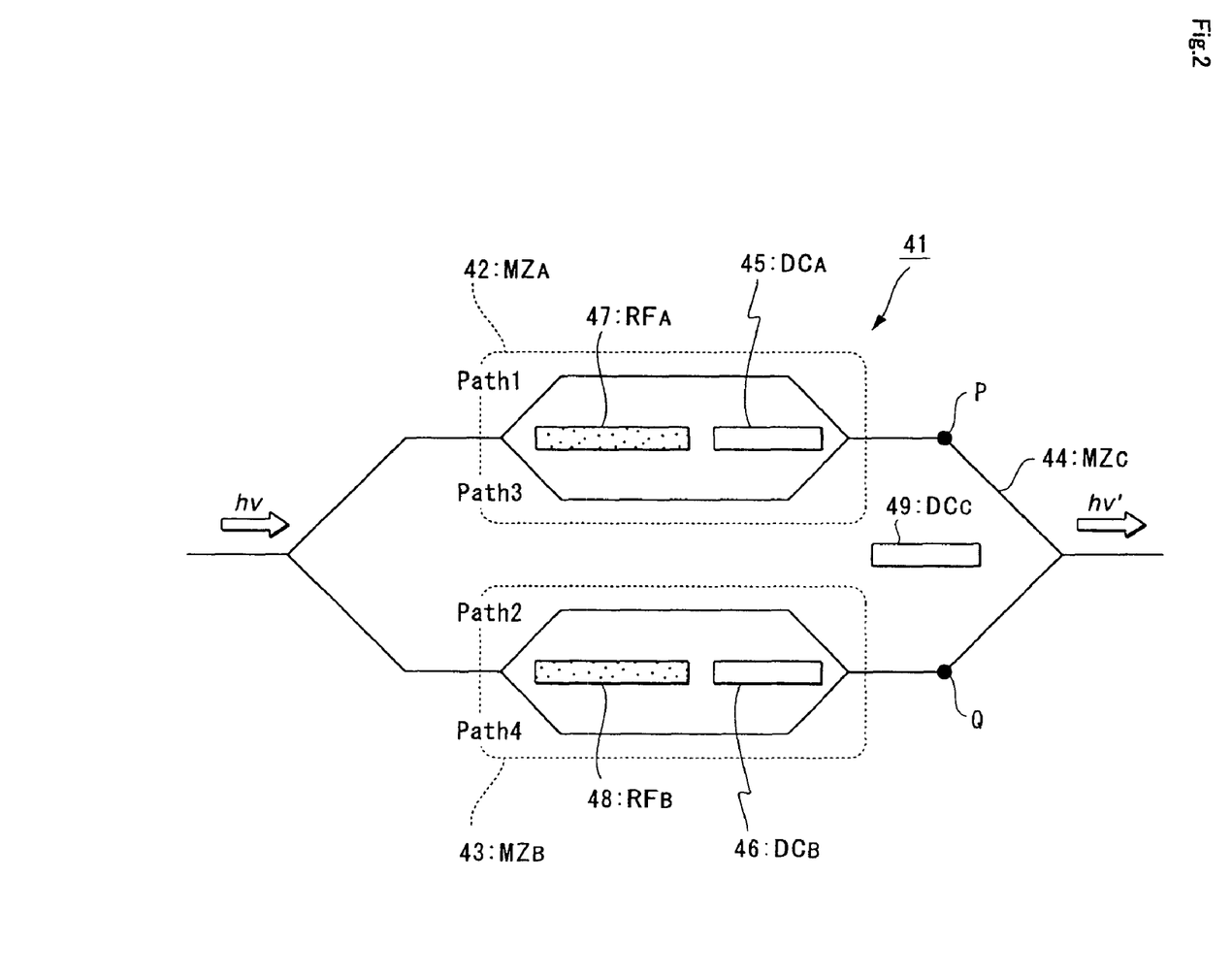
FIG. 2 is a schematic diagram showing a basic arrangement of an optical SSB modulator.
Figure 3:
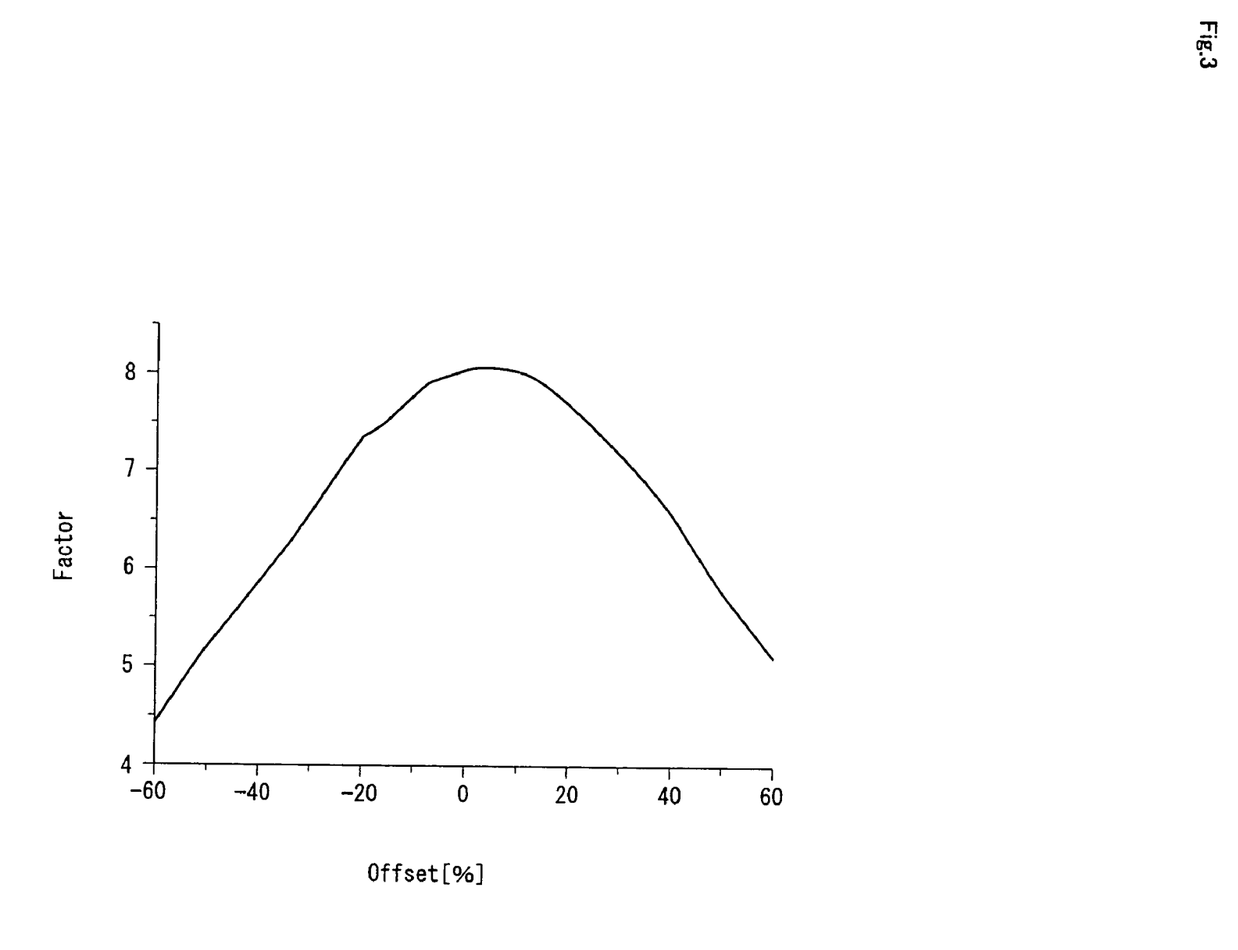
FIG. 3 is a graph showing a relationship between a Q-factor and an offset in an embodiment 1.

FIG. 2 is a schematic diagram showing a basic arrangement of an optical SSB modulator. As shown in FIG. 2(a), an optical SSB modulator (41) is provided with a first sub Mach-Zehnder waveguide ($MZ_A$) (42), a second sub Mach-Zehnder waveguide ($MZ_B$) (43), a main Mach-Zehnder waveguide ($MZ_C$) (44), a first bias adjustment electrode ($DC_A$) (45), a second bias adjustment electrode ($DC_B$) (46), a first RF electrode ($RF_A$ electrode) (47), a second RF electrode ($RF_B$ electrode) (48), and a third bias adjustment electrode ($DC_C$ electrode) (49).

Herein, the main Mach-Zehnder waveguide ($MZ_C$) (44) is a Mach-Zehnder waveguide including the $MZ_A$ and the $MZ_B$ as both of its arms.

The first bias adjustment electrode ($DC_A$ electrode) (45) is an electrode for controlling a bias voltage between two arms (Path 1 and Path 3) composing the $MZ_A$, thereby controlling a phase of light transmitted through the two arms of the $MZ_A$. On the other hand, the second bias adjustment electrode ($DC_B$ electrode) (46) is an electrode for controlling a bias voltage between two arms (Path 2 and Path 4) composing the $MZ_B$, thereby controlling a phase of light transmitted through the two arms of the $MZ_B$. The $DC_A$ electrode and the $DC_B$ electrode are preferably direct current electrodes or low frequency electrodes typically. It is to be noted that "low frequency" in the low frequency electrode means frequency of e.g. 0 Hz-500 MHz.

The first modulating electrode ($RF_A$ electrode) (47) is an electrode for inputting a radio frequency (RF) signal to the two arms composing the $MZ_A$. On the other hand, the second modulating electrode ($RF_B$ electrode) (48) is an electrode for inputting the RF signal to the two arms composing the $MZ_B$. A traveling-wave-type electrode or a resonant-type electrode can be mentioned as the $RF_A$ electrode and the $RF_B$ electrode, and the resonant-type electrode is preferable.

The $RF_A$ electrode and the $RF_B$ electrode are preferably connected to a high frequency signal source. The high frequency electric signal source is a device for controlling the signal transmitted to the $RF_A$ electrode and the $RF_B$ electrode, for which a publicly known high frequency electric signal source can be adopted. As frequencies of the high frequency signal ($f_m$ or $f_{FSK}$) inputted to the $RF_A$ electrode and the $RF_B$ electrode, e.g. 1 GHz-100 GHz can be mentioned. As the output of the high frequency electric signal source, a sinusoidal wave having a fixed frequency can be mentioned.

The $RF_A$ electrode and the $RF_B$ electrode are composed of e.g. gold, platinum, or the like. As the width of the $RF_A$ electrode and the $RF_B$ electrode, 1 μm-10 μm can be mentioned and 5 μm can be specifically mentioned. As the length of the $RF_A$ electrode and the $RF_B$ electrode, 0.1 times-0.9 times the wavelength ($f_m$) of the modulating signal can be mentioned including 0.18-0.22 times or 0.67-0.70 times, and more preferably shorter than the resonant point of the modulating signal by 20-25%. This is because with such a length, the synthesized impedance with a stub electrode remains in an appropriate region. As a more specific length of the $RF_A$ electrode and the $RF_B$ electrode, 3250 μm can be mentioned. Hereinafter, a resonant-type electrode and a traveling-wave-type electrode will be described.

A resonant-type optical electrode (resonant-type optical modulator) is an electrode for performing a modulation by using resonance of a modulating signal. A publicly known resonant-type electrode such as those described in the Japanese patent application laid-open 2002-268025 and [Tetsuya Kawanishi, Satoshi Oikawa, Masayuki Izutsu, "Planar structure resonant-type optical modulator", TECHNICAL REPORT OF IEICE, IQE2001-3 (2001-05)] can be adopted.

A traveling-wave-type electrode (traveling-wave-type optical modulator) is an electrode (modulator) for modulating light while guiding waves so that a lightwave and an electric signal are guided in the same direction (e.g. Hiroshi Nishihara, Masamitsu Haruna, Toshiaki Suhara, "optical integrated circuit" (revised and updated edition), Ohmsha, pages 119-120). A publicly known traveling-wave-type electrode such as those disclosed in Japanese patent application laid-open Nos. 11-295674, 2002-169133, 2002-40381, 2000-267056, 2000-471159, and 10-133159, for example, can be adopted as the traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes sandwiching the signal electrode, a high frequency wave outputted from the signal electrode is made easy to be impressed to the earth electrodes arranged on the left and right of the signal electrode, thereby suppressing an emission of a high frequency wave to the side of the substrate.

The third bias adjustment electrode ($DC_C$ electrode) (49) is an electrode for controlling the bias voltages of the $MZ_A$ and the $MZ_B$, thereby controlling the phase of light transmitted through the $MZ_A$ and the $MZ_B$. The third bias adjustment electrode ($DC_C$ electrode) is usually a direct current electrode or a low frequency electrode.

It is to be noted that the RF electrode may serve as both of the electrodes for the RF signal and the DC signal in the optical SSB modulator described above. Namely, either one of or both of the $RF_A$ electrode and the $RF_B$ electrode are connected to a feeder circuit (bias circuit) for supplying the DC signal and the RF signal mixed. Since the optical SSB modulator of this embodiment has the RF electrode connected to the feeder circuit (bias circuit), the RF signal (radio frequency signal) and the DC signal (direct current signal: signal related to bias voltage) can be inputted to the RF electrode, so that it can function in the same way as the optical SSB modulator described above.

3.1.2. Operation of Optical SSB Modulator

It is to be noted that the operation of an optical SSB modulator is described in detail in for example, Tetsuya Kawanishi, Masayuki Izutsu, "Optical frequency shifter using optical SSB modulator", TECHNICAL REPORT OF IEICE, OCS2002-49, PS2002-33, OFT2002-30 (2002-08) and Higuma et al., "X-cut lithium niobium optical SSB modulator, Electron Letter, vol. 37, 515-516 (2001). Namely, according to the optical SSB modulator, an upper side band (USB) signal having positively shifted a predetermined amount of frequency, and a lower side band (LSB) signal of the optical signal can be obtained 3.1.3. Optical FSK Modulator In order to realize a high speed code switching, an optical FSK modulator has substituted an RF (radio frequency) electrode or a bias adjusting electrode and the RF electrode for an electrode corresponding to the $DC_C$ of the optical SSB modulator. As one using only the RF electrode, one in which the RF electrode is connected to a feeder circuit (bias circuit) for supplying the DC signal and the RF signal mixed. As the $RF_C$ electrode, a traveling-wave-type electrode supporting a high speed switching can be preferably used. Herein, the RF electrode is an electrode supporting an input and output of an RF frequency. Also in the FSK modulator, the upper wave component and the lower wave component can be switched over to be outputted by switching over the signal voltage of the $RF_C$ electrode.

An optical FSK signal is composed of an upper side band (USB) signal and a lower side band (LSB) signal for a carrier wave ($f_0$). It is supposed in this specification that a range of vibration frequencies (namely, a frequency of an RF modulated signal from the modulator) is $\Delta f_{FSK}$. Supposing that a center frequency of the carrier wave is $f_0$, the center frequency of the USB signal is $f_0+\Delta f_{FSK}$ and the center frequency of the LSB signal is $f_0-\Delta f_{FSK}$.

3.2. Light Source

The light source (12) is a device for generating light such as a laser to be inputted to an optical FSK modulator. In the conventional optical FSK system, a wavelength of the laser itself generated from the laser light source was changed. However, in the optical FSK communication system of the present invention, the frequency is shifted by the optical modulator, so that the output of the laser light source itself can be kept constant.

3.3. Dispersive Medium

As a dispersive medium, an optical fiber, gas, and air can be mentioned. As an optical fiber, a single mode fiber can be mentioned. As a length of an optical fiber, 10 km-200 km can be mentioned. It is to be noted that a dispersion of a single mode fiber is approximately 17 ps/nm·km. Namely, lights whose wavelengths are different by 1 nm yield a time difference of approximately 17 ps upon traveling 1 km.

3.4. Controlling Means

A controlling means is a means for controlling a delay time and the like. Namely, a preferred embodiment of the FSK communication system of the present invention is an FSK communication system having a means for controlling the length of the delay time adjusted by the "means (3) for adjusting a delay time of two lights branched by the branching means" according to the frequency of the modulating signal of the optical FSK modulator, the length of the dispersive medium, and the dispersion of the dispersive medium. With such a system, the controlling means automatically outputs instructions for adjusting the delay time according to the frequency of the modulating signal of the optical FSK modulator, the length of the dispersive medium, and the dispersion of the dispersive medium, so that the delay time is automatically adjusted and a preferable FSK demodulation can be achieved.

It is to be noted that when the dispersion of the dispersive medium such as a fiber is supposed to be A [ps/nm/km], the length of the dispersive medium is supposed to be L [km], the wavelength difference between the USB signal and the LSB is supposed to be $\Delta\lambda$, and the delay of the USB signal and the LSB signal is supposed to be $\Delta t$, the following relational expression (1) is held:

$$|\Delta t|=\Delta\lambda \cdot L \cdot A [ps] \qquad (1)$$

Also, when a high speed is supposed to be c [m/s], since a relationship of $\lambda=c/f$ [m] exists, the following relationship is held when the modulating frequency is supposed to be $f_m$:

$$\Delta\lambda=[c/(f_0-f_m)]-[c/(f_0+f_m)]=2cf m/(f_0^2-f_m^2)\approx 2cfm/f_0^2.$$

Namely, the delay time has only to be adjusted according to these expressions. Supposing that the length of the optical path to be adjusted is $\Delta l$ (el), $\Delta l$ may be made $|\Delta t| \cdot c \times 10^{-12}$ [m]. Specifically, since the USB signal reaches the detector earlier, the optical path may be extended for $\Delta l$. It is to be noted that this adjustment of the optical path may be performed based on the above-mentioned logical expressions, or the optical path length may be adjusted by detecting the signal by applying, for example, a test pulse to the system.

EXAMPLE 1

An offset relationship between a Q-factor (quantity indicating a level of aperture of an eye diagram) and a delay is obtained by using a SMF of 40 km as the optical fiber, and by providing an optical path length modulation having a reversed sign respectively to the USB signal and the LSB signal. Conditions for this calculation are as follows: Bit rate: 10 Gbps, amplification to 10 dBm with an EDFA, an attenuator of 30 dB, an FSK modulator-induced phase of 52.5 degree, and an FSK modulating frequency of 12.5 GHz. The result of this is shown in FIG. 4. It is seen from FIG. 4 that the Q-factor is about 8 when the offset is 0%, and the Q-factor decreases as the offset is shifted.

INDUSTRIAL APPLICABILITY

The FSK demodulator of the present invention can be utilized in the field such as optical information and telecommunications as a new demodulator for demodulating an optical FSK signal from an optical FSK modulator.

A preferred application of the FSK communication system of the present invention is a method for measuring a dispersion of a dispersive medium using the above-mentioned FSK communication system based on a distance between the optical FSK modulator and the FSK demodulator, a modulating frequency of an optical FSK signal, and the delay time of the lights. Namely, since a predetermined relationship exists between the distance between the optical FSK modulator and the FSK demodulator, the modulating frequency of the optical FSK signal, the delay time of the lights, and the dispersion of the dispersive medium, so that the dispersion of the dispersive medium can be obtained by using this relationship and information other than the dispersion of the dispersive medium.

A preferred application of an FSK communication system of the present invention is a method for obtaining a distance between the optical FSK modulator and the FSK demodulator using the above-mentioned FSK communication system based on a dispersion of the dispersive medium existing between the optical FSK modulator and the FSK demodulator, a modulating frequency of an optical FSK signal, the delay time of the lights, and the delay time of the lights. Namely, since a predetermined relationship exists between the distance between the optical FSK modulator and the FSK demodulator, the modulating frequency of the optical FSK signal, the delay time of the lights, and the dispersion of the dispersive medium, so that the distance between the optical FSK modulator and the FSK demodulator can be obtained from this information and information other than the distance between the optical FSK modulator and the FSK demodulator.

The invention claimed is:

1. A frequency shift keying (FSK) communication system comprising:
    an optical FSK modulator;
    an FSK demodulator comprising:
        a means for branching an optical signal according to wavelengths thereof;
        a means for adjusting a delay time of two lights branched by the branching means;
        a means for detecting one optical signal branched by the branching means;
        a means for detecting a remaining optical signal branched by the branching means; and
        a means for calculating a difference between an output signal of the first photodetector and an output signal of the second photodetector,
        wherein the optical signal in the means for branching an optical signal is optical FSK signal and the means for branching an optical signal is a means for branching into an upper side band (USB) signal and a lower side band (LSB) signal of an optical FSK signal, and
        wherein the means for adjusting a delay time is capable of changing the adjusted delay time;
    a dispersive medium connecting the FSK modulator and the FSK demodulator;
    wherein the optical FSK modulator comprises:
        a first sub Mach-Zehnder waveguide ($MZ_A$);
        a second sub Mach-Zehnder waveguide ($MZ_B$);
        a main Mach-Zehnder waveguide ($MZ_C$) comprising the $MZ_A$, the $MZ_B$, an input portion for a light and an output portion for a modulated light;
        a first RF electrode ($RF_A$ electrode) inputting a radio frequency (RF) signal to two arms composing the $MZ_A$;
        a second RF electrode ($RF_B$ electrode) inputting an RF signal to two arms composing the $MZ_B$; and
        a third RF electrode ($RF_C$ electrode) comprising a traveling-wave-type electrode controlling a frequency of the light outputted from the output portion by controlling a frequency of the RF signal inputted;
        and modulating the frequency of the light outputted from the output portion by controlling a frequency of a modulating signal inputted to the $RF_C$ electrode that is the traveling-wave-type electrode corresponding to the RF signal.

2. A frequency shift keying (FSK) communication system comprising:
an optical FSK modulator;
an FSK demodulator comprising:
a means for branching an optical signal according to wavelengths thereof;
a means for adjusting a delay time of two lights branched by the branching means;
a means for detecting one optical signal branched by the branching means;
a means for detecting a remaining optical signal branched by the branching means; and
a means for calculating a difference between an output signal of the first photodetector and an output signal of the second photodetector,
wherein the optical signal in the means for branching an optical signal is optical FSK signal and the means for branching an optical signal is a means for branching into an upper side band (USB) signal and a lower side band (LSB) signal of an optical FSK signal, and
wherein the means for adjusting a delay time is capable of changing the adjusted delay time;
a dispersive medium connecting the FSK modulator and the FSK demodulator;
wherein the means for adjusting a delay time of two lights comprises a means for controlling a length of the adjusted delay time according to the frequency of the modulating signal of the optical FSK modulator, a length of the dispersive medium, and a dispersion of the dispersive medium.

3. A method of measuring a dispersion of a dispersive medium using a frequency shift keying (FSK) communication system based on a distance between an optical FSK modulator and a FSK demodulator, L, a modulation frequency on an optical FSK signal, $f_m$, and a delay time of an upper side band (USB) and lower side band (LSB) signals, $\Delta t$, comprising steps of:
measuring the delay time between the USB signal and the LSB signal, $\Delta t$; and
calculating the dispersion, A, based on the equation of $A=(|\Delta t|*f_0^2)/(2cf_m*L)$,
wherein $f_0$ is the frequency of light, and c is the velocity of light,
wherein the FSK communication system comprises:
the optical FSK modulator;
the FSK demodulator comprising:
a means for branching an optical signal according to wavelengths thereof;
a means for adjusting a delay time of two lights branched by the branching means;
a means for detecting one optical signal branched by the branching means;
a means for detecting a remaining optical signal branched by the branching means; and
a means for calculating a difference between an output signal of the first photodetector and an output signal of the second photodetector,
wherein the optical signal in the means for branching an optical signal is optical FSK signal and the means for branching an optical signal is a means for branching into an upper side band (USB) signal and a lower side band (LSB) signal of an optical FSK signal, and
wherein the means for adjusting a delay time of two lights is capable of changing the adjusted delay time;
the dispersive medium connecting the FSK modulator and the FSK demodulator.

4. A method for obtaining a distance between an optical frequency shift keying (FSK) modulator and a FSK demodulator using a FSK communication system based on a dispersion, A, of a dispersive medium existing between the optical FSK modulator and the FSK demodulator, a modulation frequency of an optical FSK signal, $f_m$, and a delay time of an upper side band (USB) and lower side band (LSB) signals, $\Delta t$, comprising steps of:
measuring the delay time between the USB signal and the LSB signal, $\Delta t$; and
calculating the distance between the optical FSK modulator and the FSK demodulator, L, based on the equation of $L=(|\Delta t|*f_0^2)/(2cf_m*A)$, wherein $f_0$ is the frequency of light, and c is the velocity of light;
wherein the FSK communication system comprises:
the optical FSK modulator;
the FSK demodulator comprising:
a means for branching an optical signal according to wavelengths thereof;
a means for adjusting a delay time of two lights branched by the branching means;
a means for detecting one optical signal branched by the branching means;
a means for detecting a remaining optical signal branched by the branching means; and
a means for calculating a difference between an output signal of the first photodetector and an output signal of the second photodetector,
wherein the optical signal in the means for branching an optical signal is optical FSK signal and the means for branching an optical signal is a means for branching into an upper side band (USB) signal and a lower side band (LSB) signal of an optical FSK signal, and
wherein the means for adjusting a delay time of two lights is capable of changing the adjusted delay time;
the dispersive medium connecting the FSK modulator and the FSK demodulator.

5. A frequency shift keying (FSK) demodulator comprising:
a means for branching an optical signal according to wavelengths thereof;
a means for adjusting a delay time of two lights branched by the branching means;
a means for detecting one optical signal branched by the branching means;
a means for detecting a remaining optical signal branched by the branching means; and
a means for calculating a difference between an output signal of the first photodetector and an output signal of the second photodetector,
wherein the optical signal in the means for branching an optical signal according to the wavelengths therefore is an optical FSK signal and the means for branching an optical signal according to the wavelengths thereof is a means for branching into an upper side band (USB) and a lower side band (LSB) signal of an optical FSK signal,
wherein the means for adjusting a delay time of two lights branched by the branching means is capable of changing the adjusted delay time, and
wherein the means for adjusting a delay time of two lights adjusts the delay time so that the USB signal delays for $|\Delta t|=\Delta\lambda \cdot L \cdot A$ [ps] where a dispersion of a dispersive medium is A [ps/nm/km], a length of the dispersive medium is L [km], a wavelength difference between the USB signal and the LSB signal is $\Delta\lambda$, and a delay of the USB signal and the LSB signal is $\Delta t$.

* * * * *